(12) United States Patent
Charrat et al.

(10) Patent No.: US 8,914,061 B2
(45) Date of Patent: Dec. 16, 2014

(54) CONTACTLESS INTEGRATED CIRCUIT HAVING NFC AND UHF OPERATING MODES

(75) Inventors: Bruno Charrat, Aix-en-Provence (FR); Nicolas Cordier, Luynes (FR)

(73) Assignee: Inside Secure, Aix-en-Provence (FR)

( * ) Notice: Subject to any disclaimer, the term of this patent is extended or adjusted under 35 U.S.C. 154(b) by 295 days.

(21) Appl. No.: 13/490,791

(22) Filed: Jun. 7, 2012

(65) Prior Publication Data

US 2012/0322500 A1 Dec. 20, 2012

(30) Foreign Application Priority Data

Jun. 17, 2011 (FR) ...................................... 11 55300

(51) Int. Cl.
| | | |
|---|---|---|
| H04W 88/02 | (2009.01) | |
| H04W 88/06 | (2009.01) | |
| H01L 25/00 | (2006.01) | |
| G06K 19/077 | (2006.01) | |
| G06K 19/07 | (2006.01) | |

(52) U.S. Cl.
CPC ...... G06K 19/0724 (2013.01); G06K 19/07767 (2013.01)
USPC ...... 455/552.1; 455/41.1; 455/41.2; 340/10.1

(58) Field of Classification Search
CPC ...... H04W 88/02; H04W 88/06; H01L 25/00; H04B 5/0068; H04B 5/0075; H04B 5/0062; H04B 5/0012; G06K 7/10009; H04M 1/7253
USPC ............. 455/552.1, 41.1, 41.2, 556.1, 550.1, 455/63.3, 66.1, 84, 553.1, 558, 333; 327/564; 340/10.1–10.5, 5.61–5.64
See application file for complete search history.

(56) References Cited

U.S. PATENT DOCUMENTS

| | | | | |
|---|---|---|---|---|
| 7,215,976 | B2 * | 5/2007 | Brideglall | 455/552.1 |
| 7,501,953 | B2 * | 3/2009 | Diorio et al. | 340/572.4 |
| 7,564,340 | B2 * | 7/2009 | Kowalski et al. | 340/10.1 |
| 7,994,923 | B2 * | 8/2011 | Watanabe et al. | 340/572.7 |
| 8,422,946 | B2 * | 4/2013 | Bangs et al. | 455/41.1 |
| 8,547,207 | B2 * | 10/2013 | Wang et al. | 340/10.1 |
| 8,692,653 | B2 * | 4/2014 | Shionoiri et al. | 340/10.1 |

(Continued)

FOREIGN PATENT DOCUMENTS

| | | |
|---|---|---|
| EP | 2012257 A2 | 1/2009 |
| WO | 2004034317 A2 | 4/2004 |
| WO | 2009135722 A1 | 11/2009 |

OTHER PUBLICATIONS

Search Report issued Apr. 19, 2012 in FR Application No. 1155300.

*Primary Examiner* — Pablo Tran
(74) *Attorney, Agent, or Firm* — Panitch Schwarze Belisario & Nadel LLP

(57) ABSTRACT

A contactless integrated circuit includes modulation and demodulation circuits configured to connect to an HF antenna circuit to emit and receive HF signals by inductive coupling in a reader mode, modulation and demodulation circuits configured to connect to a UHF antenna to emit and receive UHF signals by electric coupling in a reader mode, a data processing circuit connected to the modulation and demodulation circuits, and configured to provide data to be emitted to the modulation circuits, and to process received signals, transmitted by the demodulation circuits, the demodulation circuits including a common demodulation circuit to equally process signals received by the UHF and HF antennas.

19 Claims, 6 Drawing Sheets

(56) References Cited

U.S. PATENT DOCUMENTS

| | | |
|---|---|---|
| 2005/0186904 A1 | 8/2005 | Kowalski et al. |
| 2005/0212674 A1* | 9/2005 | Desmons et al. .......... 340/572.7 |
| 2007/0229277 A1* | 10/2007 | Usami ........................ 340/572.7 |
| 2008/0068132 A1* | 3/2008 | Kayanakis et al. .......... 340/10.1 |
| 2012/0129571 A1* | 5/2012 | Charrat et al. ............. 455/550.1 |

* cited by examiner

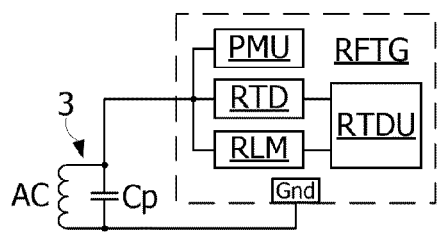
Fig. 1
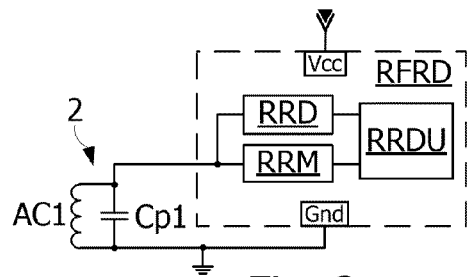
Fig. 2
Fig. 3
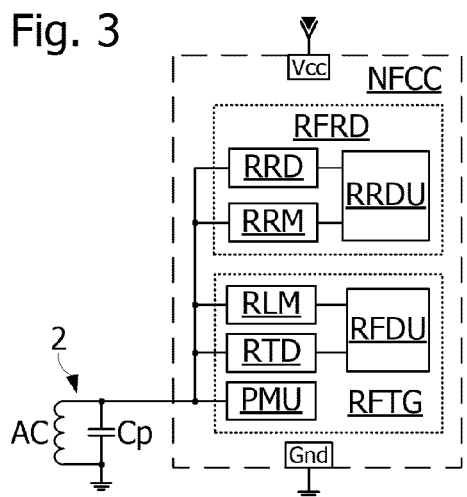
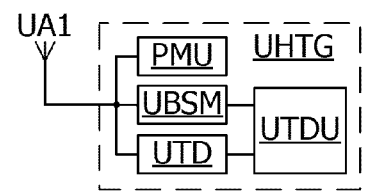
Fig. 4
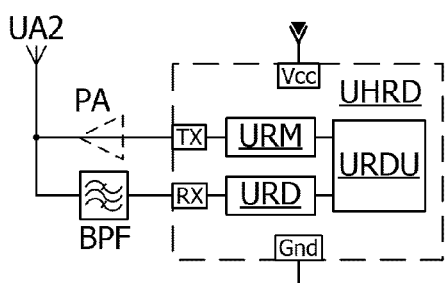
Fig. 5
Fig. 6
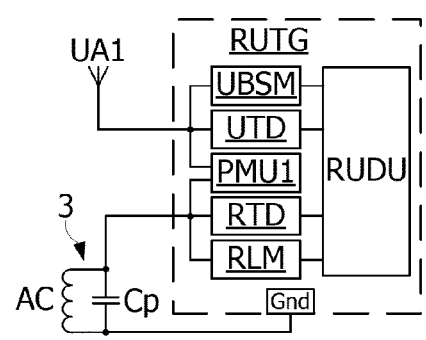

CONTACTLESS INTEGRATED CIRCUIT HAVING NFC AND UHF OPERATING MODES

BACKGROUND OF THE INVENTION

Embodiments of the present invention relate to RFID (Radio Frequency Identification) contactless integrated circuits which can communicate by inductive coupling or electric field coupling with other devices.

RFID integrated circuits operating by inductive coupling can be of tag type or tag reader type. FIG. 1 schematically shows a tag integrated circuit RFTG operating by inductive coupling. The integrated circuit RFTG is connected to an antenna circuit 3 and includes a modulation circuit RLM, a demodulation circuit RTD, an electric power supply circuit PMU and a processing circuit RTDU connected to the circuits RTD and RLM. The antenna circuit 3 is tuned at a resonance frequency around 13.56 MHz, and includes one or more coils AC and a tuning capacitor Cp connected in parallel to the coil AC. The antenna circuit is connected between an input of the circuits RLM, RTD and PMU and the ground Gnd of the circuit RFTG. The electric power supply circuit PMU generally includes a diode rectifier circuit to supply a power supply voltage from a voltage appearing across the antenna circuit when the integrated is subjected to an alternating magnetic field emitted by an RFID tag reader. The modulation circuit RLM generates a load modulation sub-carrier which is combined to data to be emitted provided by the processing circuit RTDU. The demodulation circuit RTD extracts from a signal received by the antenna circuit 3, data transmitted by an RFID reader, generally by modulating the amplitude of the emitted magnetic field. The circuit RTD transmits the demodulated data to the processing circuit RTDU. The processing circuit RTDU generally includes a process unit connected to volatile and non volatile memories. The tag circuit RFTG may be, for example, used in a payment or access control card, or in an identification document such as a passport or identity card.

FIG. 2 schematically shows an integrated circuit of reader RFRD operating by inductive coupling. The integrated circuit RFRD includes two terminals RX, TX connected to an antenna circuit 2, a ground terminal Gnd, an electric power supply terminal Vcc, a processing circuit RRDU, a modulation circuit RRM connected between the terminal TX and the circuit RRDU, and a demodulation circuit RRD connected between the terminal RX and the circuit RRDU. The antenna circuit 2 includes a first terminal connected to a ground terminal Gnd of the circuit RFRD, and a second terminal connected to the terminals RX and TX. The antenna circuit 2 is also tuned at the resonance frequency around 13.56 MHz, and includes one or more coils AC1 and a tuning capacitor Cp1 connected in parallel to the coil AC1. The processing circuit RRDU generally includes a process unit connected to volatile and non volatile memories and may be connected to other circuits. The reader circuit RFRD may for, example, be used in an access control reader or a payment terminal.

Recently, the Near Field Communication technology NFC has also been developed, allowing a same integrated circuit to operate in a reader mode or a card emulation mode in which the integrated circuit emulates an RFID tag which may communicate with an RFID reader or another NFC circuit. To that end, such an integrated circuit gathers the circuits RFTG and RFRD of FIGS. 1 and 2, connected to the antenna circuit 2. Thus, FIG. 3 schematically shows an NFC component, referred to as NFCC, including the circuits RFTG and RFRD. The component NFCC also includes an electric power supply terminal Vcc and a ground terminal Gnd. The antenna circuit 2 is connected to the circuits RRD, RRM, RTD, RLM and PMU. The functions performed by the processing circuits RTDU and RRDU of the circuit NFCC may be performed by a single processing circuit.

Exchanging data using the RFID or NFC technology is performed by inductive coupling between the antenna coil of a reader and the antenna coil of a tag, through an alternating magnetic field at the standardized frequency 13.56 MHz, emitted by the reader. Circuits of reader type require big antenna coils, around 12 cm² for a reading distance around 2 cm, which is a significant constraint if the circuit is to be integrated into another system such as a mobile phone.

In addition, other contactless tag technologies exist, such as the UHF technology, based on an electric coupling between two antennas. This technology makes it possible to reach reading distances of several meters. The frequency bands used (860 to 960 MHz) by the UHF tag technology allow antennas smaller than the NFC antenna coils to be used. UHF tags generally emit data in a passive way using a retro-modulation technique called "backscattering," consisting in modulating the reflection coefficient of the antenna of the UHF tag. UHF tags may also be powered by the electric field emitted by a UHF reader. The UHF technology is mainly used in the field of traceability in production and logistics, and also to monitor items to be sold in shops.

FIG. 4 schematically shows an integrated circuit of a UHF tag, referred to as UHTG. The circuit UHTG includes a modulation circuit UBSM, a demodulation circuit UTD and an electric power supply circuit PMU, which are connected to an antenna UA1. The circuits UBSM and UTD are connected to a processing circuit UTDU.

FIG. 5 schematically shows a UHF reader circuit, referred to as UHRD. The circuit UHRD includes a modulation circuit URM and a demodulation circuit URD. The circuit URM is connected by a terminal TX to an antenna UA2, possibly through an amplification circuit PA. The circuit URD is connected by a terminal RX to the antenna through a band-pass filter BPF. The circuit UHRD is powered between terminals Vcc and Gnd.

In International Patent Publication No. WO 2004/034317 (also published as US Patent Publication No. 2005/0186904), it has been suggested to combine circuits operating by inductive coupling and electric coupling in a same tag circuit. FIG. 6 schematically shows a tag circuit, referred to as RUTG. The tag circuit RUTG is connected to a UHF antenna UA1 and an HF antenna circuit 3. The circuit RUTG includes HF modulation and demodulation circuits RLM, RTD connected to the antenna circuit 3, UHF modulation and demodulation circuits UBSM, UTD connected to the antenna UAL and a processing circuit RUDU connected to the modulation circuits RLM, UBSM and the demodulation circuits RTD, UTD. The circuit RUTG also includes an electric power supply circuit PMU1 connected to the antenna UA1 and the antenna circuit 3.

There is a need for devices combining NFC and UHF technologies, in particular to offer new applications thanks to the longer range provided by the UHF technology. However, integrating into a same component HF and UHF modulation and demodulation circuits leads to a component having relatively significant dimensions. There is therefore a need to decrease the dimensions of such a component.

BRIEF SUMMARY OF THE INVENTION

Embodiments of the invention relate to a contactless integrated circuit including: modulation and demodulation circuits configured to connect to an HF antenna circuit to emit and receive HF signals by inductive coupling in a reader mode, modulation and demodulation circuits configured to connect to a UHF antenna to emit and receive UHF signals by electric coupling in a reader mode, a data processing circuit connected to the modulation and demodulation circuits, and configured to provide data to be emitted to the modulation circuits, and to process received signals, transmitted by the demodulation circuits, the demodulation circuits including a common demodulation circuit to equally process signals received by the UHF antenna and the HF antenna circuit.

According to one embodiment, the integrated circuit includes a modulation circuit configured to connect to an HF antenna circuit to emit HF signals by inductive coupling in a tag mode, and a modulation circuit configured to connect to the UHF antenna to emit UHF signals by electric coupling in a tag mode, the common demodulation circuit being configured to equally process signals received in the reader and tag modes.

According to one embodiment, the common demodulation circuit includes a frequency converter circuit to convert UHF signals received by the UHF antenna into signals modulated at an HF carrier frequency, the UHF signals converted and the signals received by the HF antenna circuit being demodulated by a same demodulation circuit.

According to one embodiment, the frequency converter circuit includes a local oscillator configured to generate an oscillator signal at a frequency having a difference with a UHF carrier frequency used to modulate the UHF signals, equal to the HF carrier frequency, and a frequency mixer circuit to mix the UHF signals received with the oscillator signal.

According to one embodiment, the common demodulation circuit includes a first envelope detection circuit connected to the UHF antenna and a second envelope detection circuit connected to the HF antenna circuit, the first and second envelope detection circuits being connected to a same signal decoding circuit.

According to one embodiment, the envelope detection circuits perform phase detection.

According to one embodiment, the common demodulation circuit includes a first envelope detection circuit connected to the UHF antenna and supplying an envelope signal from a received UHF signal, and a modulation circuit to modulate an HF carrier signal at an HF frequency with the envelope signal, the modulated envelope signal being provided to an HF signal demodulation circuit.

According to one embodiment, the HF carrier is generated by an HF modulation circuit provided to modulate a data signal to be emitted by the HF antenna circuit.

According to one embodiment, the integrated circuit includes a power supply circuit configured to rectify each HF and UHF received signal and generate from the rectified signals a power supply voltage of the integrated circuit in the absence of external electric power supply.

According to one embodiment, the integrated circuit is configured to emit and receive signals, in tag and reader modes, complying with at least one of the standards ISO14443 type A or B, ISO15693, and ISO180006 type A, B or C.

According to one embodiment, the integrated circuit includes an input terminal of an inhibit signal indicating if it may start a communication in UHF reader mode or not.

According to one embodiment, the integrated circuit includes an input terminal of an external clock signal used to generate HF and UHF carrier signals.

According to one embodiment, the integrated circuit includes an output terminal of data signals to be emitted in UHF reader mode in the form of a modulated UHF radio signal.

Embodiments of the invention relate to a device including: a GSM transceiver provided with a UHF antenna, a clock generator coupled to the GSM transceiver, a processor configured to connect to the GSM network by way of the GSM transceiver, including an integrated circuit according to one of the embodiments of the invention, the integrated circuit being connected to an HF antenna circuit.

According to one embodiment, the integrated circuit includes a terminal for receiving UHF signals connected to the antenna of the GSM transceiver, and an input terminal of an inhibit signal indicating if it may start a communication in UHF reader mode or not, the input terminal receiving from the processor an activity signal indicating if the GSM transceiver is in activity for a connection to the GMS network or not.

According to one embodiment, the integrated circuit includes an output terminal of data signals to be emitted in UHF reader mode, the output terminal of data signals being connected to the processor to emit a UHF radio signal modulated by the GSM transceiver.

According to one embodiment, the integrated circuit includes a terminal for receiving UHF signals connected to the antenna of the GSM transceiver, the reception terminal being configured to pass from low impedance to high impedance when an activity signal indicates that the GSM transceiver is in activity for a connection to the GMS network.

According to one embodiment, the integrated circuit includes an input terminal of an external clock signal used to generate HF and UHF carrier signals, the clock signal input terminal being connected to the clock generator.

According to one embodiment, the integrated circuit includes a terminal for receiving UHF signals connected to a UHF antenna different from the UHF antenna of the GSM transceiver.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1 schematically shows an HF tag integrated circuit;

FIG. 2 schematically shows an HF reader integrated circuit;

FIG. 3 schematically shows an NFC component;

FIG. 4 schematically shows a UHF tag;

FIG. 5 schematically shows a UHF reader;

FIG. 6 schematically shows an HF/UHF tag circuit;

DETAILED DESCRIPTION OF THE INVENTION

Embodiments of the invention are based on the comparison of HF and UHF physical layers as described in the standards ISO14443, types A and B and ISO15693, for the HF physical layer, and ISO18000-6 types A, B and C (EPC Gen2) for the UHF physical layer. The various parameters of the HF and UHF physical layers are summed up in the following table:

TABLE 1

|  | HF (ISO14443 A/B) | HF (ISO15693) | UHF (ISO18000-6 A/B/C) |
| --- | --- | --- | --- |
| Carrier frequency | 13.56 MHz | 13.56 MHz | 860-960 MHz |
| Reader modulation | A: 100% ASK<br>B: 10% ASK | 10% ASK or<br>100% ASK | A: 27% to 100% ASK<br>B: 30.5% or 100% ASK<br>C: 80 to 100% ASK |
| Reader rate | 106 to 847 kbits/s | 26.48 kbits/s | A: 33 kbits/s<br>B: 10 or 40 kbits/s<br>C: 26.7 to 128 kbits/s |
| Reader bit encoding | A: Miller modified<br>B: NRZ | 1 among 4 | A: PIE<br>B: Manchester<br>C: PIE |
| Tag modulation | Load modulation | Load modulation | Retromodulation |
| Tag rate | 106 to 847 kbits/s | 28.48 kbits/s | 40 to 640 kbits/s |

(ASK: "Amplitude Shift Keying")
(NRZ: Non Return to Zero)
(BPSK: "Binary Phase Shift Keying")
(OOK: "On-Off Keying")
(PIE: "Pulse Interval Encoding")

The modulations made by the tags are seen by a reader like a low index amplitude modulation.

In Table 1, it may be observed that in HF and UHF modes, the modulations in reader mode are identical with a possible difference corresponding to the modulation factor, and the rates have the same order of magnitude. In addition, the modulations in tag mode are near. A common demodulator may therefore be considered for HF and UHF transmission modes, for each of the reader and tag operating modes.

Figure 7:
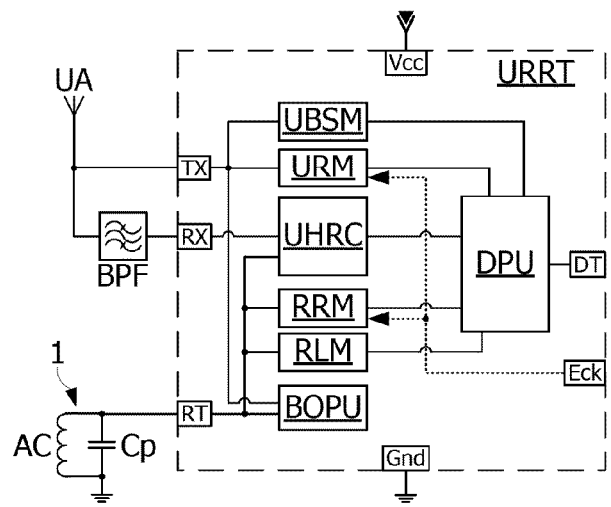
FIG. 7 schematically shows an NFC/UHF component, according to one embodiment.

FIG. 7 shows an NFC/UHF component according to one embodiment. In FIG. 7, the NFC/UHF component referred to as URRT includes modulation and demodulation circuits for the reader and tag modes and the HF and UHF transmission modes. The component URRT may be powered by an external source between a terminal Vcc and a ground terminal Gnd. The modulation circuits of the component URRT include a modulation circuit URM for the UHF reader mode, and a modulation circuit of backscattering type UBSM for the UHF tag mode, these circuits being connected by a terminal TX to a UHF antenna referred to as UA, as well as a modulation circuit RRM for the HF reader mode, and a load modulation circuit RLM for the HF tag mode, these circuits being connected by a terminal RT to an HF antenna circuit referred to as 1. Each modulation and demodulation circuit of the component URRT is connected to a processing circuit DPU which may include a single process unit, or a process unit for the HF and UHF tag modes and a process unit for the HF and UHF reader modes, or a different process unit for each HF and UHF reader modes, and HF and UHF tag modes.

The circuit DPU is configured to encode the signals to be sent as a function of the operating mode, reader or tag, of the component, and an HF or UHF data transmission protocol. The circuit DPU is also configured to decode the received signals as a function of the shapes of the received signals. To that end, the circuit DPU is configured to determine the mode, reader or tag, in which the component URRT operates, as well as the transmission protocol in which the signals are transmitted. The circuit DPU may thus include several reception channels in parallel, each reception channel implementing a respective transmission protocol. Thus, only the reception channel corresponding to the transmission protocol of received signals supplies data. The circuit DPU may be connected to a data exchange terminal DT of the component URRT to receive data to be emitted to an external circuit or transmit received data by the component URRT to this external circuit.

The component URRT also includes a power supply circuit BOPU, configured to supply a power supply voltage to the component URRT from the signals received by the antennas UA, AC, when the component is not powered, i.e., when it operates in tag mode, HF or UHF. The circuit BOPU conventionally supplies a rectified voltage from an alternating signal coming from one or the other of the two antennas UA, AC. To that end, the circuit BOPU includes, for example, a diode or a diode rectifier, and a smoothing capacitor (not shown) connected to each terminal RT and TX.

According to the invention, the component URRT includes a single demodulation circuit UHRC adapted to each reader and tag mode, HF and UHF, the circuit UHRC being connected to the terminal RT and the antenna UA through a terminal RX and a band-pass filter BPF.

The component URRT includes clock circuits to generate the various carrier and clock signals required to generate the signals to be emitted and demodulate the received signals. Thus, the component URRT may include an oscillator, for example of the ring oscillator type, to generate a clock signal of the unit DPU. In HF tag mode, the carrier signal is extracted from the received signal and used as clock signal. In UHF tag mode, the circuit RTG may generate a clock signal from the clock signal of the unit DPU. To generate HF carrier signals at the frequency F0 (=13.56 MHz), and UHF carrier signals at the frequency F1, the component URRT may include a quartz oscillator or a phase lock circuit receiving an external clock signal by an external connection terminal Eck of the component URRT. This external clock signal may, for example, come from communication circuits (GSM, Bluetooth, WiFi, or the like) of a device such as a mobile phone in which the component URRT is embedded.

Figure 8:
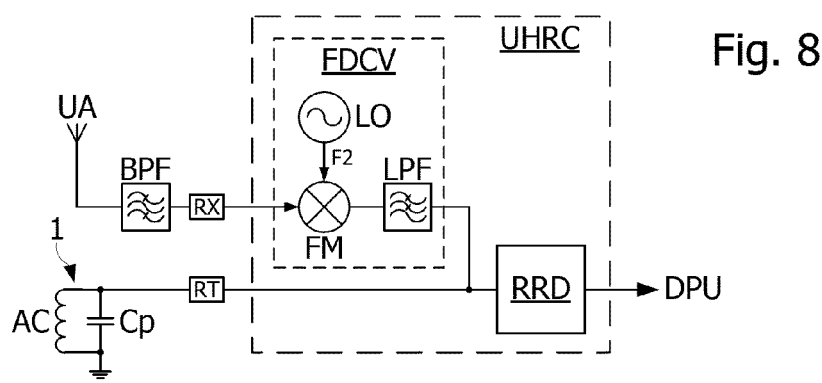
FIG. 8 schematically shows a demodulation circuit of the NFC/UHF component, according to one embodiment.

FIG. 8 shows the demodulation circuit UHRC, according to one embodiment. The circuit UHRC includes an HF demodulation circuit RRD connected to the antenna AC and a frequency conversion circuit FDCV connected in input to the antenna UA and in output to the input of the circuit RRD. The circuit FDCV is configured to decrease the frequency of the carrier of the UHF signals received by the antenna UA, to the frequency of the HF signals received by the antenna circuit 1. The circuit RRD includes a single input to equally receive HF signals which come from the antenna circuit 1 and the circuit FDCV, and is configured to demodulate these signals independently of their origins. The circuit FDCV includes a frequency mixer circuit FM including an input connected to the antenna UA, an input connected to the output of a local oscillator LO, and an output connected to the input of the circuit RRD through a low-pass filter LPF. The oscillator LO, for example, includes an oscillating circuit controlled by a phase lock loop PLL. The circuit RRD may be configured to perform an amplitude demodulation or amplitude and phase demodulation (I, Q).

Figure 9:
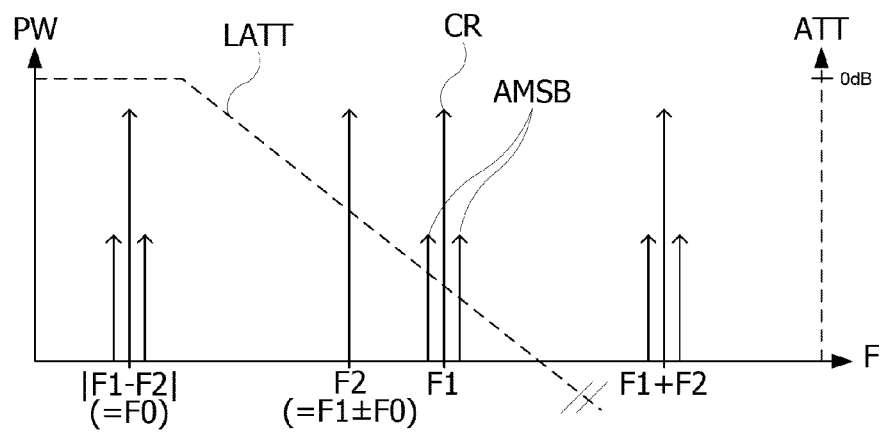
FIG. 9 shows a power frequency spectrum.

FIG. 9 shows the operation of the circuit FDCV in the form of a power PW or attenuation ATT frequency spectrum, as a function of frequency. The oscillator LO produces a signal at the frequency F2 substantially equal to the frequency F1 of the carrier of the UHF signals (for example 900 MHz) decreased or increased by the frequency F0 of the carrier of the HF signals (at 13.56 MHz). FIG. 9 shows the carrier CR of the UHF signal at the frequency F1 of a UHF signal and its two sub-carriers AMSB modulated in amplitude. A UHF signal received by the antenna UA is thus mixed by the circuit FM with the oscillator signal at the frequency F2 (=F1−F0 or F1+F0), produced by the oscillator LO. The signal generated by the circuit FM includes a signal centered on a carrier at the frequency F1+F2 and a signal centered on a carrier at the frequency |F1−F2|=F0. FIG. 9 also shows the attenuation curve LATT of the filter LPF. The filter LPF is configured to have a cutoff frequency located between the frequencies F0 and F2, and thus reject the signals in particular at the frequencies F2, F1 and F1+F2, and only keep the signal centered on the frequency F0. Thus, the signal in output of the circuit FDCV has characteristics analogous to an HF signal received by the antenna circuit 1 and may therefore be demodulated by the demodulation circuit RRD provided to demodulate the HF signals received by the antenna circuit 1, in reader mode. Indeed, the HF signals to be demodulated, susceptible of being received, are signals coming from a tag emission circuit such as one of the circuits RLM and UBSM. The load modulation performed by the module RLM and the retromodulation performed by the module UBSM are seen by a reader as a low index amplitude modulation. In addition, according to Table 1, bit encoding in UHF mode has a rate lower than that of the HF mode. Digitally processing, in particular decoding demodulated signals coming from HF tags, may therefore perform the process of signals coming from UHF tags. The result is that processing the signals, at the output of the circuit RRD, whether they come from an NFC or UHF tag, may also be common.

Figure 10:
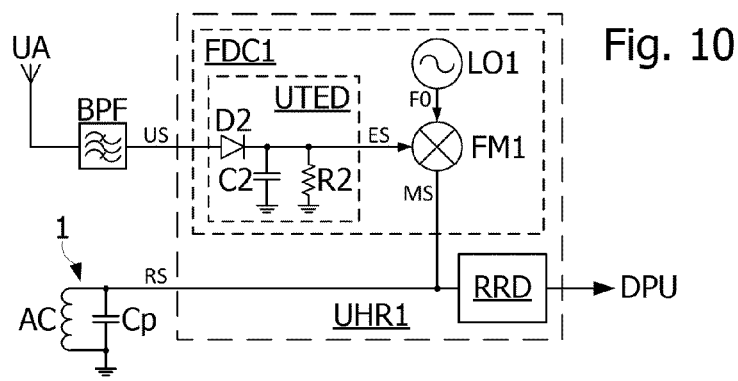
FIG. 10 schematically shows the demodulation circuit of the NFC/UHF component, according to another embodiment.

FIG. 10 shows another embodiment of the demodulation circuit, referred to as UHR1, of the component URRT. The demodulation circuit UHR1 differs from the circuit UHRC in that the circuit FDCV is replaced by another conversion circuit FDC1 including an envelope detection circuit UTED associated to a local oscillator LO1 and a frequency mixer circuit FM1. The circuit UTED includes an input diode D2 whose anode is connected to the antenna UA and whose cathode is connected to the output of the circuit UTED, and connected to the ground through a capacitor C2 and a resistor R2. The output of the circuit UTED is connected to the circuit FM1 receiving on another input a signal at the frequency F0 produced by the oscillator LO1.

Figure 11A:
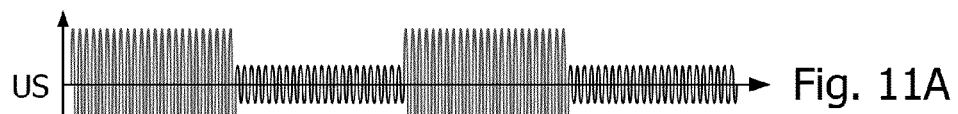
FIGS. 11A, 11B, 11C show chronograms of signals of the demodulation circuit.
Figure 11B:
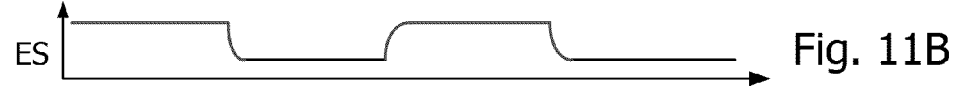
Figure 11C:
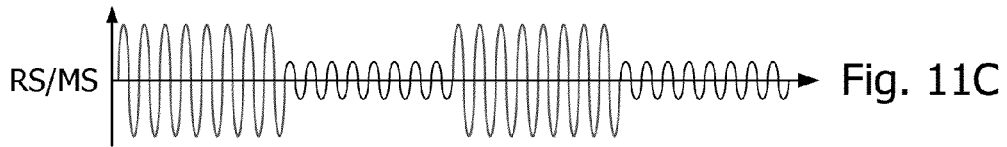

FIGS. 11A, 11B, 11C are chronograms of signals, showing the operation of the circuit UHR1. FIGS. 11A and 11C show UHF signals referred to as US, and HF signals referred to as RS. FIG. 11B shows an envelope signal ES extracted from the signal US by the circuit UTED. The signals US and RS correspond to the signals received by the antennas UA, AC, i.e., UHF and HF carrier signals modulated in amplitude by the signal ES. A same modulation is used in emission in HF and UHF modes (ASK), the rate in UHF mode being lower, but in the same order of magnitude as that of the HF mode. Thus, the signal MS supplied by the circuit FM1 and corresponding to the envelope of signal ES supplied by the circuit UTED and modulated by the HF carrier signal at the frequency F0, may be processed by the HF demodulation circuit RRD.

Figure 12:
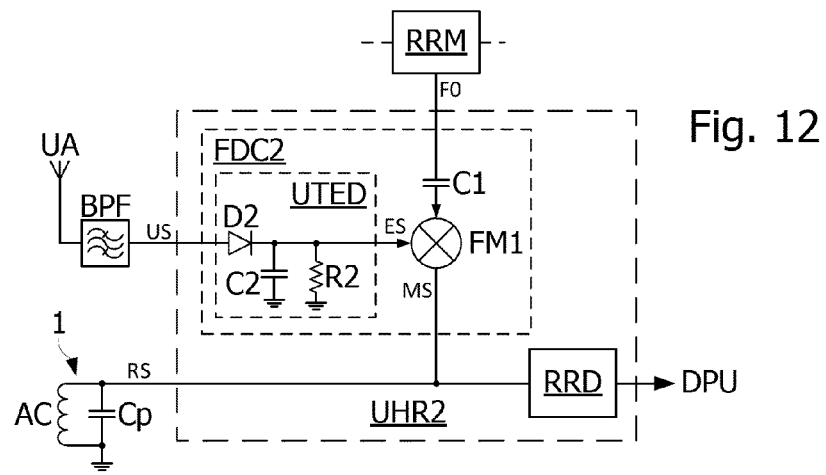
FIGS. 12 to 16 schematically show the demodulation circuit of the NFC/UHF component, according to various embodiments.

FIG. 12 shows another embodiment of the demodulation circuit, referred to as UHR2. The circuit UHR2 differs from the circuit UHR1 in that the circuit FDC1 is replaced by another conversion circuit FDC2. The circuit FDC2 differs from the circuit FDC1 in that the local oscillator LO1 is suppressed and replaced by a link including a connection capacitor C1, connecting an input of the circuit FM1 to a carrier signal output at the frequency F0 of the modulation circuit RRM. This carrier signal is used by the circuit RRM to modulate signals to be emitted in HF reader mode.

Figure 13:
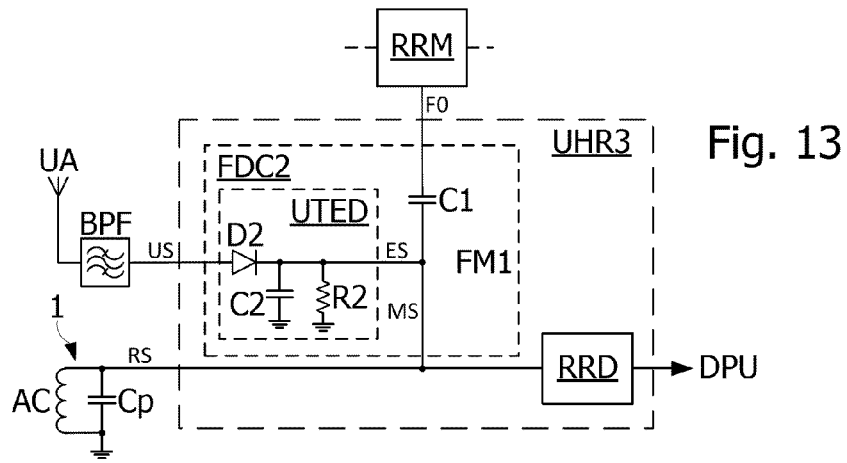

FIG. 13 shows another embodiment of the demodulation circuit, referred to as UHR3. The circuit UHR3 differs from the circuit UHR2 in that the frequency mixer circuit FM1 is suppressed and replaced by a simple connection point, possibly with one or more switches, in particular to avoid the HF carrier signal from being introduced into a signal received in HF mode.

Figure 14:
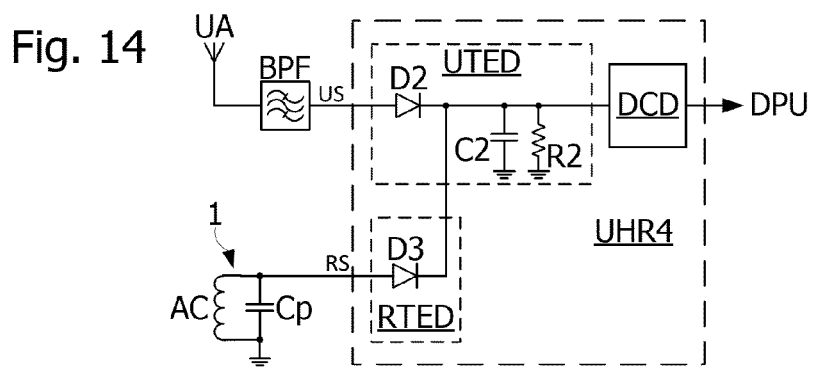

FIG. 14 shows another embodiment of the demodulation circuit, referred to as UHR4. The circuit UHR4 differs from the circuit UHR2 in that the circuits FM1 and RRD are suppressed and replaced by another envelope detection circuit RTED and a signal decoding circuit DCD. The circuit RTED is connected in input to the antenna circuit 1, and the circuits UTED and RTED are connected in output to the decoding circuit DCD which is common to both HF and UHF modulations. The circuit RTED includes an input diode D3 whose anode is connected to the antenna AC and whose cathode is connected to the output of the circuit RTED, and connected to the ground through a capacitor and a resistor which may be the capacitor C2 and the resistor R2 of the circuit UTED. Indeed, the diodes D2 and D3 have different characteristics to be able to rectify signals which frequency is 13.56 MHz for one and 900 MHz for the other. However, the filtering circuit including the capacitor C2 and the resistor R2 may be common because the data are transmitted with a rate in the same order of magnitude. The circuit DCD includes a single input equally receiving envelope signals supplied by one or the other circuit RTED, UTED, and coming from the antennas UA, AC, and is configured to decode these envelope signals independently of their origins.

The operation of the circuits UHED and RFED may also be shown by FIGS. 11A, 11B, 11C. FIGS. 11A and 11C show UHF signals referred to as US and HF signals referred to as RS. FIG. 11B shows an envelope signal ES extracted from one or the other signal US and RS by one of the circuits UTED, RTED. The signals US and RS correspond to the signals received by the antennas UA, AC, i.e., UHF and HF carrier signals modulated in amplitude by the signal ES. HF and UHF modulations are analog (ASK) and the rates provided by these modulations are in the same order of magnitude. Thus, the signal envelope supplied by the circuit UTED may be processed by a decoding circuit (DCD) adapted to process the signal envelope supplied by the circuit RTED.

Figure 15:
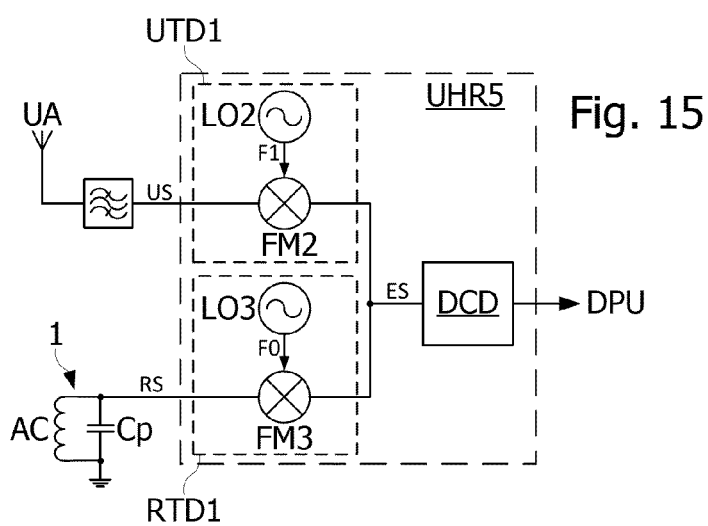

FIG. 15 shows another embodiment of the demodulation circuit, referred to as UHR5. The circuit UHR5 differs from the circuit UHR4 in that the envelope detection circuits UTED, RTED are each suppressed and replaced by a mixer circuit FM2, FM3 connected to a respective local oscillator LO2, LO3. The circuit FM2 receives the signals US from the antenna UA and a carrier signal at the frequency F1 from the oscillator LO2. The circuit FM3 receives the signals RS from the antenna AC and a carrier signal at the frequency F0 from the oscillator LO3. The output signals of the circuits FM2, FM3 which correspond to the envelope signals ES of the circuits UTED, RTED, are decoded by the decoding circuit DCD.

Figure 16:
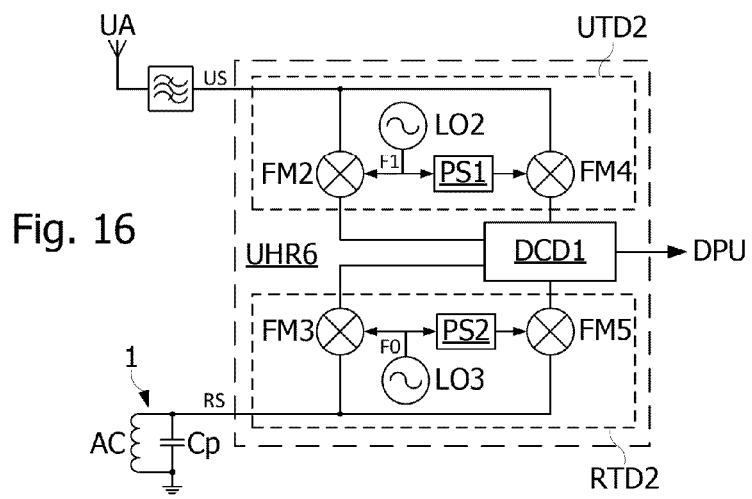

FIG. 16 shows another embodiment of the demodulation circuit, referred to as UHR6. The circuit UHR6 differs from the circuit UHR5 in that it is configured to perform a demodulation I, Q or a demodulation in amplitude and phase. To that end, the circuit UHR6 includes additional mixer circuits FM4, FM5 and signal phase-shifting circuits PS1, PS2 introducing a phase difference of + or −90°. The output of the oscillator LO2 is connected to the input of the circuits FM2 and PS1, and the output of the oscillator LO3 is connected to the input of the circuits FM3 and PS2. The output of the circuit PS1 is connected to the input of the circuit FM4, and the output of the circuit PS2 is connected to the input of the circuit FM5. The outputs of the circuits FM2, FM3, FM4 and FM5 supplying signals in phase and in phase quadrature, are connected to an input of a decoding circuit DCD1 configured to perform a demodulation in amplitude and phase and signal decoding.

Figure 17:
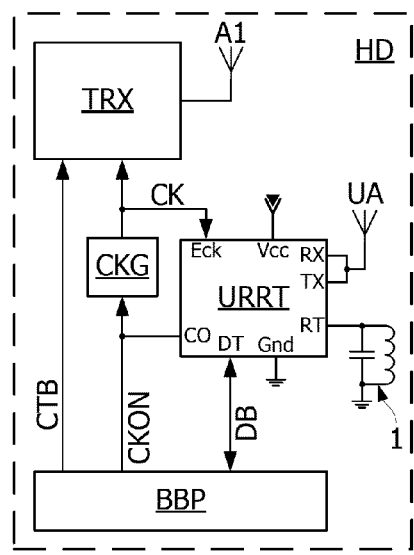
FIGS. 17 to 19 schematically show a mobile phone in which the NFC/UHF component is integrated, according to various embodiments.

FIG. 17 shows a mobile phone HD provided with the component URRT. The component URRT may include one or the other modulation circuit UHRC, and UHR1 to UHR6 previously described, or more. The phone HD includes a base-band processor BBP and radio communication circuitry including a clock generator CKG and a transceiver TRX connected to an antenna A1. The transceiver TRX is, for example, a quad-band GSM transceiver (850, 900, 1800 or 1900 MHz). The clock generator CKG is, for example, of VTCXO type (Voltage Controlled Temperature-Compensated Crystal Oscillator) supplying a clock signal CS of 26 MHz to the transceiver TRX. The phone HD includes other elements which are not shown for the sake of simplicity, such as a display, a keyboard, an electric battery, a microphone, a speaker, and the like.

The processor BBP is connected to the transceiver TRX through a control bus CTB which carries, in particular, control signals. The processor BBP also controls the clock generator CKG by way of an ON/OFF signal CKON. Thus, the processor BBP uses the clock generator CKG and the transceiver TRX to establish a connection with the GSM network.

The terminal DT of the component URRT is connected to the processor BBP through a data bus DB. The terminals TX and RX are coupled to the antenna UA, and the terminal RT is coupled to the antenna circuit 1. In reader mode, the component URRT uses the clock generator CKG whose output is also connected to the terminal Eck. To that end, the component URRT also controls the clock generator CKG by generating the ON/OFF signal CKON that its processing circuit DPU emits by a terminal CO.

Preferably, the circuitry connected to the terminals RX and TX of the component URRT is designed to have high impedance when the phone has a GSM activity, so as not to disturb the operation of the transceiver TRX.

When the phone HD is powered, the component URRT may be powered by the terminals Vcc and Gnd, and may therefore operate in tag and reader modes. When the phone HD is not powered, the component URRT can operate in tag mode only.

In practice, implementing applications of reading and/or writing HF or UHF tags may be performed in two ways. According to a first way, the processor BBP manages NFC/UHF applications and it therefore executes the programs designed to implement these applications ("application programs"). The component URRT is then only used as an NFC/UHF coupler. The component URRT sends to HF/UHF tags commands supplied by the processor BBP and receives data supplied by the tags, which are then supplied to the processor BBP for processing.

According to a second way, the component URRT is responsible for the reading applications of NFC/UHF tags. The unit DPU must in this case have sufficient computing power and program-memory to host and execute application programs.

In tag mode (or tag emulation), the component URRT may also receive commands supplied by an HF/UHF reader which are then supplied to the processor BBP for processing, and send to the NFC/UHF reader data supplied by the processor BBP, or also process the data received and generate data to be emitted. If the component URRT must be able to operate in tag mode (UHF or HF) without power, it must process the data received and generate the data to be emitted.

Figure 18:
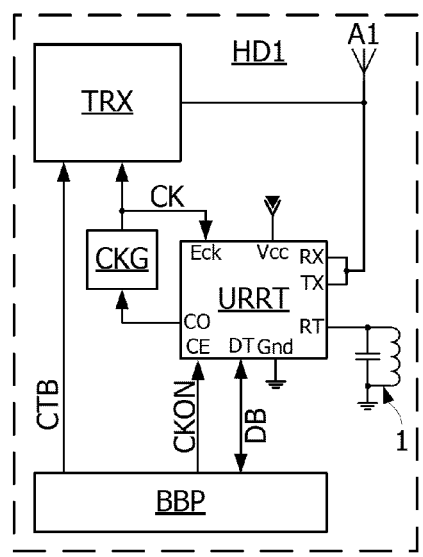

FIG. 18 shows a mobile phone HD1 provided with the component URRT. The phone HD1 differs from the phone HD in that the terminals RX, TX of the component URRT are not connected to a specific UHF antenna, but to the antenna A1 of the phone. The terminals RX, TX may be configured to switch from low to high impedance when a GSM activity is detected, so as not to detune the antenna A1 and not to reduce the performances of the transceiver TRX. In addition, the processor BBP does not directly control the circuit CKG, but controls it through the component URRT. To that end, the circuit DPU of the component URRT also receives the signal CKON emitted by the processor BBP, by a terminal CE of the component URRT. The unit DPU manages the clock generator CKG transparently as far as its activation by the processor BBP is concerned. Thus, when the signal CKON emitted by the processor BBP has a value corresponding to the switching on of the clock generator CKG (active value), indicating a GSM activity, the unit DPU activates the generator CKG. But when the signal CKON has a value corresponding to the switching off of the clock generator CKG (inactive value), the unit DPU may decide to switch on the clock generator CKG at any time to perform a transaction in reader mode with an NFC/UHF tag. If the processor BBP puts the signal CKON to the active value while the component URRT is performing or starting a transaction, the priority is given to the GSM activity and the component URRT stops the UHF transaction while leaving the generator CKG in the activated state.

Thus, the component URRT uses the radiotelephony antenna A1 of the phone and the clock generator CKG, while avoiding conflicts of electrical signals on the antenna A1.

The radiotelephony circuitry of the phone HD1 thus put at the disposal of the component URTT includes:

the antenna A1 and the clock generator CKG to receive data sent by a UHF tag, read via the terminal RX, the clock generator CKG to send data to an NFC tag, read via the terminal RT, and the processor BBP, the clock generator CKG and the antenna A1 to emit data to a UHF tag.

It is to be noted that in NFC tag and reader modes, the component URRT may emit and receive data independently of the GSM activity of the phone HD1. It is the same in UHF tag mode.

Figure 19:
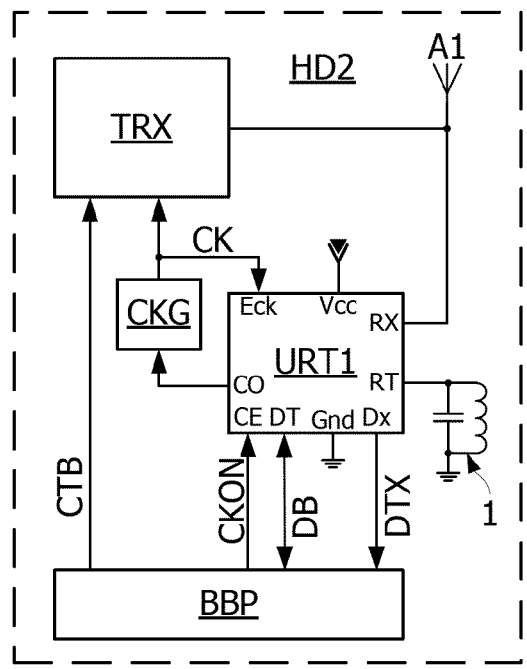
Figure 20:
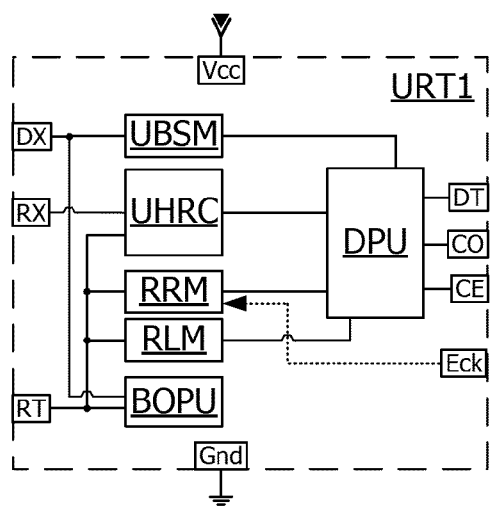
FIG. 20 schematically shows an NFC/UHF component, according to another embodiment.

FIG. 19 shows a mobile phone HD2 provided with a component URT1. The structure of the component URT1 is shown in greater details in FIG. 20. The component URT1 differs from the component URRT in that the modulation circuit URM and the output terminal TX are suppressed. The output terminal TX is replaced by a base-band output DX, here a port of the unit DPU, which supplies to the processor BBP a data carrier signal DTX to be emitted in reader mode to a UHF tag.

Thus, the radiotelephony circuitry of the phone HD2 here put at the disposal of the component URT1 includes:

the antenna A1 and the clock generator CKG to receive data sent by a UHF tag, read via the terminal RX, the clock generator CKG to send data to an NFC tag, read via the terminal RT, the processor BBP, the clock generator CKG, the transceiver TRX and the antenna A1 to emit an electric field and modulate this electric field as a function of the data signal DTX, so as to emit data to a UHF tag.

It is to be noted that it may be wished to better decouple the received signal with respect to the sent signal in reader mode. In this case, the circuit URT1 (terminal RX) may be connected to a different antenna from the radiotelephony antenna A1, for example the antenna UA of FIG. 17.

It will be clear to those skilled in the art that the present invention is susceptible of various embodiments, in particular those resulting from combinations of the various embodiments previously described. In particular, the NFC/UHF component may include modulation and demodulation circuits for the tag mode only. Thus, the circuits UBSM and RLM shown in FIG. 7 may be suppressed, and the common demodulation circuit UHRC may be configured to process signals transmitted by a tag only. The NFC/UHF component may also include two demodulation circuits, one being adapted to the tag mode and the other to the reader mode, both demodulation circuits may be chosen among the various embodiments (UHRC, and UHR1 to UHR6) previously described.

In addition, the present invention is not limited to the various embodiments of a phone, previously described, but is susceptible of being applied to any type of device provided with UHF radio transmission means in the frequency band used in particular by the protocol ISO18000-6, and in particular to any type of radiotelephony device for voice or data transport, for example a 3G modem card intended to be inserted into a computer.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A contactless integrated circuit comprising:

modulation and demodulation circuits configured to connect to an HF antenna circuit to emit and receive HF signals by inductive coupling in a reader mode, modulation and demodulation circuits configured to connect to a UHF antenna to emit and receive UHF signals by electric coupling in a reader mode, a data processing circuit connected to the modulation and demodulation circuits, and configured to provide data to be emitted to the modulation circuits, and to process received signals, transmitted by the demodulation circuits, the demodulation circuits comprising a common demodulation circuit to equally process signals received by the UHF antenna and the HF antenna circuit.

2. The integrated circuit of claim 1, further comprising a modulation circuit configured to connect to an HF antenna circuit to emit HF signals by inductive coupling in a tag mode, and a modulation circuit configured to connect to the UHF antenna to emit UHF signals by electric coupling in a tag mode, the common demodulation circuit being configured to equally process signals received in the reader and tag modes.

3. The integrated circuit of claim 1, wherein the common demodulation circuit comprises a frequency converter circuit to convert UHF signals received by the UHF antenna into signals modulated at an HF carrier frequency, the UHF signals converted and the signals received by the HF antenna circuit being demodulated by a same demodulation circuit.

4. The integrated circuit of claim 3, wherein the frequency converter circuit comprises a local oscillator configured to generate an oscillator signal at a frequency having a difference with a UHF carrier frequency used to modulate the UHF signals, equal to the HF carrier frequency, and a frequency mixer circuit to mix the UHF signals received with the oscillator signal.

5. The integrated circuit of claim 1, wherein the common demodulation circuit comprises a first envelope detection circuit connected to the UHF antenna and a second envelope detection circuit connected to the HF antenna circuit, the first and second envelope detection circuits being connected to a same signal decoding circuit.

6. The integrated circuit of claim 5, wherein the envelope detection circuits perform phase detection.

7. The integrated circuit of claim 1, wherein the common demodulation circuit comprises a first envelope detection circuit connected to the UHF antenna and supplying an envelope signal from a received UHF signal, and a modulation circuit to modulate an HF carrier signal at an HF frequency with the envelope signal, the modulated envelope signal being provided to an HF signal demodulation circuit.

8. The integrated circuit of claim 7, wherein the HF carrier is generated by an HF modulation circuit provided to modulate a data signal to be emitted by the HF antenna circuit.

9. The integrated circuit of claim 1, further comprising a power supply circuit configured to rectify each HF and UHF received signal and generate from the rectified signals a power supply voltage of the integrated circuit in the absence of external electric power supply.

10. The integrated circuit of claim 1, configured to emit and receive signals, in tag and reader modes, complying with at least one of the standards ISO14443 type A or B, ISO15693, and ISO180006 type A, B or C.

11. The integrated circuit of claim 1, further comprising an input terminal of an inhibit signal indicating if it may start a communication in UHF reader mode or not.

12. The integrated circuit of claim 1, further comprising an input terminal of an external clock signal used to generate HF and UHF carrier signals.

13. The integrated circuit of claim 1, further comprising an output terminal of data signals to be emitted in UHF reader mode in the form of a modulated UHF radio signal.

14. A device comprising:
a GSM transceiver provided with a UHF antenna,
a clock generator coupled to the GSM transceiver,
a processor configured to connect to the GSM network by way of the GSM transceiver,
comprising an integrated circuit according to claim 1, the integrated circuit being connected to an HF antenna circuit.

15. The device of claim 14, wherein the integrated circuit comprises a terminal for receiving UHF signals connected to the antenna of the GSM transceiver, and an input terminal of an inhibit signal indicating if it may start a communication in UHF reader mode or not, the input terminal receiving from the processor an activity signal indicating if the GSM transceiver is in activity for a connection to the GMS network or not.

16. The device of claim 15, wherein the integrated circuit further comprises an output terminal of data signals to be emitted in UHF reader mode, the output terminal of data signals being connected to the processor to emit a UHF radio signal modulated by the GSM transceiver.

17. The device of claim 14, wherein the integrated circuit further comprises a terminal for receiving UHF signals connected to the antenna of the GSM transceiver, the reception terminal being configured to pass from low impedance to high impedance when an activity signal indicates that the GSM transceiver is in activity for a connection to the GMS network.

18. The device of claim 14, wherein the integrated circuit comprises an input terminal of an external clock signal used to generate HF and UHF carrier signals, the clock signal input terminal being connected to the clock generator.

19. The device of claim 14, wherein the integrated circuit comprises a terminal for receiving UHF signals connected to a UHF antenna different from the UHF antenna of the GSM transceiver.

* * * * *